United States Patent
Horvath

(10) Patent No.: US 6,681,804 B2
(45) Date of Patent: Jan. 27, 2004

(54) DEVICE FOR CONTROLLING THE OUTPUT OF ROTARY COMPRESSORS

(75) Inventor: Josef M. Horvath, Nebersdorf (AT)

(73) Assignee: Hoerbiger Kompressortechnik Services GmbH, Vienna (AT)

( * ) Notice: Subject to any disclaimer, the term of this patent is extended or adjusted under 35 U.S.C. 154(b) by 112 days.

(21) Appl. No.: 10/067,805

(22) Filed: Feb. 8, 2002

(65) Prior Publication Data
US 2002/0108659 A1 Aug. 15, 2002

(30) Foreign Application Priority Data
Feb. 12, 2001 (AT) ............ 205/2001

(51) Int. Cl.[7] ............................. F16K 27/00
(52) U.S. Cl. ..................... 137/614.2; 137/271
(58) Field of Search ............... 137/614.2, 271; 417/295

(56) References Cited

U.S. PATENT DOCUMENTS

| 1,424,305 A | 8/1922 | Hofberg |
| 2,301,976 A | 11/1942 | Schellens |
| 2,991,002 A | * 7/1961 | Quertier ............... 417/295 |
| 3,770,014 A | * 11/1973 | Limberg ............... 137/614.2 |
| 4,569,636 A | * 2/1986 | Bauer et al. ......... 137/614.2 X |
| 4,991,622 A | 2/1991 | Brewer et al. |

FOREIGN PATENT DOCUMENTS

| DE | 3447797 | 7/1985 |
| DE | 3414077 | 10/1985 |
| EP | 0233445 | 8/1987 |

* cited by examiner

Primary Examiner—Kevin Lee
(74) Attorney, Agent, or Firm—Dykema Gossett PLLC

(57) ABSTRACT

A device for controlling the output of rotary compressors which includes a housing (8) formed of two housing parts which define connection flanges (1, 3) at opposite ends thereof and which define a dividing plane (13) therebetween that is slanted toward the plane of the connection flanges (1, 3) on both sides between a regulating flap valve (4), which controllably changes the passage cross-section of the suction duct, and a check valve (7) that is arranged behind the flap check valve in the direction of flow. The housing (8) may be assembled in different relative positions of the two housing parts (14, 15), which makes manufacturing simpler and more cost-effective and makes possible different relative positions of the two connection flanges (1, 3) to one another.

5 Claims, 2 Drawing Sheets

DEVICE FOR CONTROLLING THE OUTPUT OF ROTARY COMPRESSORS

BACKGROUND OF THE INVENTION

1. Field of the Invention

The invention relates to devices for controlling the output of rotary compressors, which devices have a regulating flap valve and a check valve in a common housing, the regulating flap valve controllably changing the passage cross section of the suction duct of a rotary compressor and the check valve being located behind the regulating flap valve in the direction of flow.

2. The Prior Art

It is known to change the cross section of the passage of the suction duct of a rotary compressor using a built-in regulating flap valve so as to adjust the output of the rotary compressor according to individual requirements. Independent thereof, it is in most cases also necessary with compressors of this type to be able to tightly close the suction duct after shutting the compressor down so that the sealed-off medium will not flow back, since it contains in many cases oil that has been injected for lubrication or cooling.

A device of this type is disclosed in DE 34 47 797 C2, for example, wherein the element to prevent back-flow and the controllable throttle are designed as a flap valve and wherein they are arranged one behind the other in a common housing and in the same flow path, which make minor pressure losses possible at optimum operation of the two valves, independent from one another. Especially as a result of the lateral swiveling position of the check valve, which is biased by means of a weight or a spring in the closing direction, there is required in this known configuration a relatively complicated-designed housing for the two valves, whereby its manufacturing and machining is relatively complicated and costly. Furthermore, there is also no possibility for variations relative to the connection geometry with these known housing designs because of the pre-set flow geometry, so that connections placed in varying directions may be realized only by using additional connection pieces that would enlarge the structural dimensions in total.

It is the object of the present invention to provide an improved device of the aforementioned type wherein the disadvantages are avoided in the known corresponding device and wherein there is made possible simplification of the entire construction and easier machining, while maintaining the functional advantages, and thereby make possible a reduction in cost in general. Furthermore, a reduction in size is to be provided also by simple means at the most possible variable connection geometry.

SUMMARY OF THE INVENTION

This object is achieved according to the present invention with device of the aforementioned type wherein the housing is divided between the two valves in a dividing plane that is slanted toward the plane of the connection flanges on both sides and wherein the housing may be assembled with different relative positions of the two housing parts. The separation in the areas between the two flap valves makes basically possible optimization of the two housing parts independent from one another, especially in view of manufacturing in a cost-effective injection molding or die-casting method as well as simple construction and the establishment of different relative positions of the two housing parts by which they may be assembled and whereby different relative positions of the two assembled housing parts correspond, in any case, also to the different connection geometry through the angle of the dividing plane between the connection flanges on both sides.

In a highly preferred embodiment of the invention the dividing plane extends at an angle of 45° to the planes of the connection flanges, which in one possible position extend in parallel with one another, and guide elements are arranged on the two housing parts that are oriented parallel to one another in the area of the dividing plane outside of the cross section of the flow, the guide elements permitting relative rotation of the two parts by 180°. An adjustment of the relative position of the two connection flanges can be achieved in a very simple manner, which is sufficient for practical use in most cases, whereby the connection flanges can extend in a parallel plane in one possible assembly position and the two connection flanges can be arranged in two planes extending perpendicular to one another in another assembly position. In one case, the entire device has a cross-flow from the inlet side to the outlet side essentially in a straight line (with a double 45° deflection oriented in the opposite direction), whereas in the other case, the flow is two times deflected in the same direction at 45°, which is in facto a total deflection of the flow by 90°. There are now only housing parts required for these two versions that are designed the same —the necessary connection version is created only during assembly without further different attachments.

Cooperating recesses and projections may be provided on the guide elements of the two housing parts for determination of mutual positioning whereby in a preferred additional embodiment of the invention there are inserted preferably pin-type slide-in elements into corresponding groove-type recesses between the cooperating guide elements for mutual fixing of the two housing parts. This design makes possible simple assembly or a simple and secure attachment of the two housing parts to one another.

According to an especially preferred additional embodiment of the invention, both housing parts continually expand toward their connection flanges without back-tapering and they are manufactured by injection molding or die-casting technology and are preferably made of fiber-reinforced synthetic material or aluminum. The production of the two housing parts can thereby be further simplified and designed more cost-effective as well. Sand cores or core parts, which are complicated in their removal, are not necessary for manufacturing. Especially by manufacturing the two housing parts using the aluminum die-casting technology, the cooperating connection and sealing surfaces may be created on the housing parts in such a precise manner that additional machining is no longer necessary, which naturally reduces manufacturing costs even further.

The invention will now be explained in more detail with the help of an embodiment illustrated in the drawings.

DETAILED DESCRIPTION OF THE PREFERRED EMBODIMENT

Figure 1:
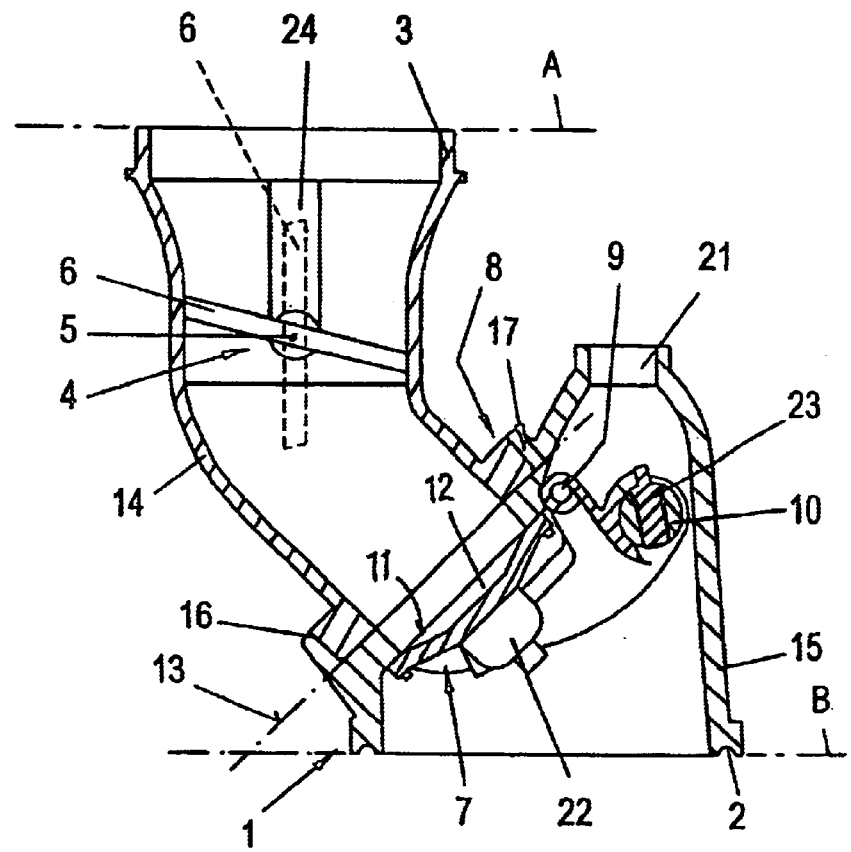
FIG. 1 shows a cross section through a preferred embodiment of a device according to the present invention wherein the housing parts are oriented such that the flange connections at its opposite ends extend in parallel with one another.
Figure 2:
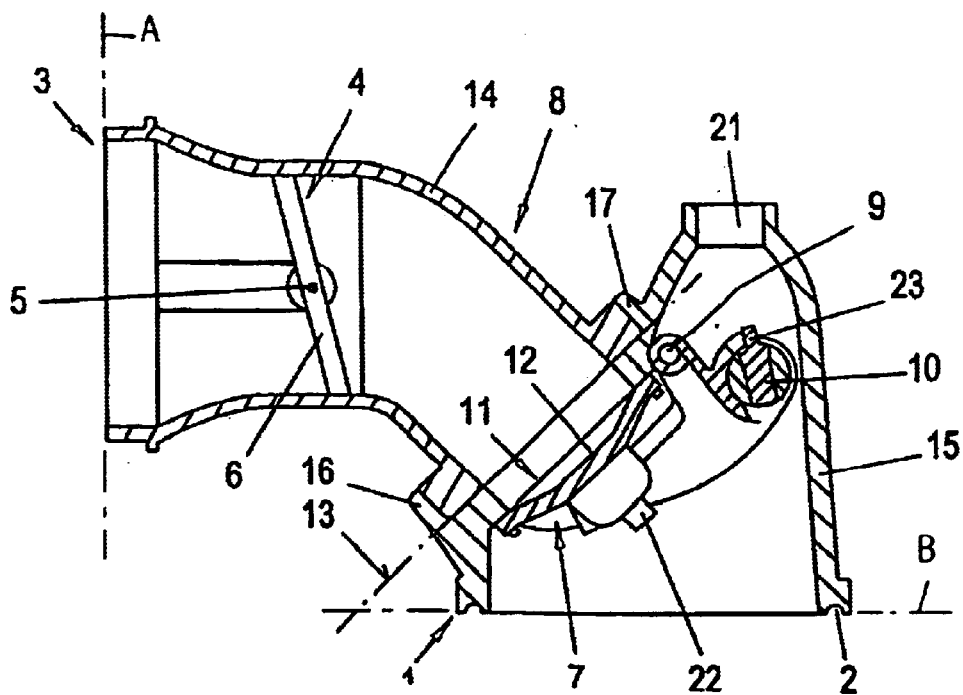
FIG. 2 shows the device of FIG. 1 wherein the housing parts are reoriented such that the flange connections at its opposite ends extend perpendicularly to one another.
Figure 3:
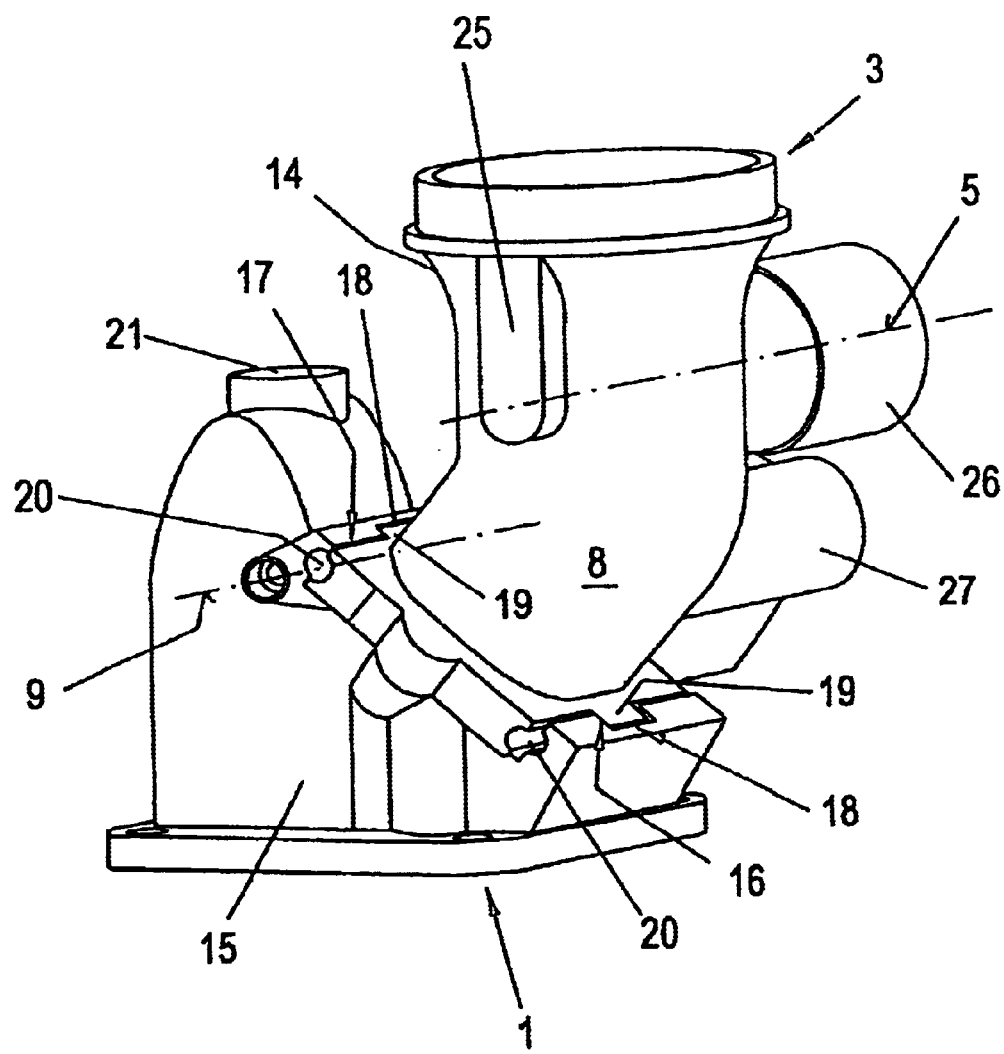
FIG. 3 shows a perspective view of the device of FIG. 1 at a slant angle and from behind.

The device for controlling the output of rotary compressors shown in FIGS. 1–3 is connected during operation to the inlet port or the suction port of the rotary compressor (not further illustrated). It includes a lower connection flange 1 which is connected to the rotary compressor, with an O-ring inserted in the groove 2. The upper connection flange 3 is joined to the connecting feed line or to a muffler, an air filter or the like (also not further illustrated). To regulate the cross-sectional area of the passage of the suction duct leading through the device, a regulating flap valve 4 is provided, which has a regulating flap 6 that may be pivoted about a pivot pin 5 extending perpendicularly to the plane of FIGS. 1 and 2, and whereby the regulating flap 6 closes the passage cross-section in the illustrated position and which in turn fully opens up to a position indicated by dotted lines in FIG. 1. Additionally, a check valve 7 is located downstream of the regulating flap valve to cooperate with the regulating flap valve in a common housing. The check valve 7 includes a return-kick flap 12 having a counterweight 10 pretensioned in the closing direction toward a seat 11 whereby the check valve 7 stops the back-flow of the sealed medium from the compressor side.

The housing 8 is divided between the two valves 4, 7 in a dividing plane 13 that lies slanted toward the planes A, B of the connection flanges 1, 3 on both sides, and the housing 8 may be assembled with different relative positions of the two housing parts 14, 15 in a manner easily seen in FIGS. 1 through 3. The dividing plane 13 is slanted by 45° in the illustrated embodiment relative to the planes A, B of the connection flanges 1, 3 at both sides, and there are arranged in the area of the dividing plane 13 and outside of the flow cross-section and laterally thereto two guide elements 16, 17 on the two housing parts 14, 15, which are oriented parallel to one another and which permit relative rotation of the two parts by 180° and thereby allow the different relative positions of the housing parts 14, 15 illustrated in FIGS. 1 and 2. It can be ensured thereby in a very simple manner that the illustrated connection of the upper connection flange 3 extends upwardly according to FIG. 1 or to the side according to FIG. 2, which is very advantageous when considering local assembly conditions whereby it does not require any additional connection points that would make the bearing position more complicated and increase the dimensions of the entire arrangement.

Cooperating recesses and projections 18, 19 (see FIG. 3) are provided on the guide elements 16, 17 to fix the mutual position of the two housing parts 14, 15 whereby preferably pin-type slide-in elements may be inserted between groove-type recesses 20 for mutual fixing of the two housing parts 14, 15 or the cooperating guide elements 16, 17 (not shown here separately).

Both housing parts 14, 15 continually expand toward the outer connection flanges 1 or 3 without back-tapering (see FIGS. 1 and 2) so that there is possible in a very simple and cost-effective manner the manufacturing by die-casting technology without sand core or other core parts, which are complicated to install or uninstall. Manufacturing by injection molding or die-casting technology is preferred whereby fiber-reinforced synthetic materials or aluminum may be employed, for example. The parts may be made to such precision, especially in manufacturing by the aluminum die-casting technology, that no subsequent machining is necessary for the cooperating guide elements 16, 17, the seat 11, or the connection flanges 1, 3 (including seal grooves and the like).

Only for the sake of completeness, there is still reference made here to a locked connection fitting 21 provided at the upper area of the housing part 15 during operation of the device as well as two stop elements 22, 23 made of resilient material for movement restriction or impact reduction of the return-kick flap 12 in the open position of the check valve 7 (not illustrated).

The installation of the check valve 7 is performed by insertion of the complete return-kick flap 12 from below and across the flange 1 whereby the pivot pin 9 may be inserted from the outside and subsequently fixed in place. The regulating flap valve 4 is completed by the insertion of the regulating flap 6 from the side of the upper connection flange 3 and across the groove 24 in the lateral housing protrusion 25 whereby the adjusting motor 26 may be laterally connected and correspondingly attached to the pivot pin 5 of the regulating flap 6. Likewise, there is provided an exhaust valve housing 27 laterally on the device in FIG. 3 whose switching elements may be actuated here together with the regulating flap (in a not illustrated manner).

Apart from the illustrated and discussed design, the two housing parts could be designed differently in regard to the relative position between the connection flanges and the dividing plane and in regard to the arrangement and orientation of the mutual guide elements whereby other or additional relative positions of the two connection flanges to one another may be realized as well in a clearly reasonable manner. Additionally, the upper housing part 14 could also be designed without a built-in regulating flap valve, if so desired, for use with other output controls of the compressor (e.g. speed control).

What is claimed is:

1. A device for attachment to a rotary compressor to control fluid output therefrom, said device comprising:

a housing including first and second housing parts which define a fluid duct therethrough, said first housing part defining a first outer connection flange defining a first connection plane, and said second housing part defining a second outer connection flange defining a second connection plane, said first and second housing parts being interconnected along a dividing plane that is slanted relative to said first and second connection planes, and said first and second housing parts being adjustably interconnected along said dividing plane, a regulating flap valve within said first housing part to control fluid flow through said fluid duct, and a check valve in said second housing part downstream of said regulating flap valve.

2. A device according to claim 1, wherein the dividing plane (13) lies at an angle of 45° to said first and second connection planes, said connection flanges extending in parallel with one another in one possible relative position of the first and second housing parts, and wherein guide elements are arranged on the first and second housing parts that are oriented parallel to one another in the area of the dividing plane outside of a cross section of the fluid duct, said guide elements permitting relative rotation of the first and second housing carts 180°.

3. A device according to claim 2, including cooperating recesses and projections on the guide elements of the first and second housing parts for determination of mutual positioning.

4. A device according to claim 2, including pin-type slide-in elements inserted into corresponding groove-type recesses between the cooperating guide elements for mutual fixing of the first and second housing parts.

5. A device according to claim 1, wherein said first and second housing parts continually expand toward their respective outer connection flanges without back-tapering and are manufacture by injection molding or die-casting technology and are made of fiber-reinforced synthetic material or aluminum.

\* \* \* \* \*